Patented Nov. 17, 1931

1,832,038

UNITED STATES PATENT OFFICE

JOSEPH V. MEIGS, OF BOSTON, MASSACHUSETTS, ASSIGNOR TO MEIGSOID CORPORATION, OF JERSEY CITY, NEW JERSEY, A CORPORATION OF NEW JERSEY

ARTIFICIAL RESIN AND PROCESS OF MAKING SAME

No Drawing.     Application filed July 17, 1922. Serial No. 575,648.

The present invention is in part a continuation of my copending application Serial No. 517,721, filed Nov. 25, 1921, and like my former application is concerned with the production of chemical products whose properties render them useful as artificial resins, plastics and the like.

As in my former application one of the chief classes of raw materials employed is that group of bodies chemically known as carbohydrates.

The simpler carbohydrates, i. e. the so-called monosaccharides are alcohols, especially polyhydric alcohols, (the names of which end in the suffix "ose", e. g. glucose, levulose etc.) and at the same time are either aldehydes or ketones. The monosaccharides may therefore be divided into two classes, viz. the aldoses and ketoses. A prefix may be placed before such terms to indicate the number of carbon atoms in the molecule. Thus we have the tri-aldose, (glyceric aldehyde): the tetra-aldose erythrose): the penta-aldose, (xylose): the hexaketose (levulose), etc.

The more complex carbohydrates may be considered to be formed from the simpler or monosaccharides (which rarely contain more than nine carbon atoms in the molecule) by the union of two or more monosaccharide molecules with the simultaneous elimination of one or more molecules of water. Thus sucrose, the chief constituent of cane or beet sugar, may be considered to be derived from the union of a molecule of glucose with a molecule of levulose and the elimination of a molecule of water. Sucrose is therefore termed a disaccharide since it may be considered to be formed by the union of two molecules of monosaccharides. Similarly, tri- tetra- and poly- saccharides may be considered to be formed by the union of three or more molecules of monosaccharides. Raffinose is a typical trisaccharide, and starch, inulin and glycogen are polysaccharides. Cellulose is a polysaccharide. Xylan, a polysaccharide contained in corn cobs, cherry gum and bran is not uncommon, and yields xylose on hydrolysis with water or dilute acids. Araban, a polysaccharide found in gum arabic, yields arabinose when treated with hydrolytic agents, e. g. dilute acids or dilute acids in conjunction with salts.

A carbohydrate may therefore be defined as an aldehyde-alcohol or a ketone-alcohol or a derivative of such bodies, more particularly an anhydride-like derivative.

As employed in the present application, the term carbohydrate includes also such derivatives of carbohydrates as for example the saccharates, or compounds of saccharides and metals (e. g. potassium saccharates etc.) such as may be found in raw sugar and molasses.

This discussion is given in order to explain the meaning and scope of the term carbohydrate as used in the specification and claims.

The term is of sufficient scope to include the various commercial forms of cane and beet sugar, e. g. crude cane or beet juice, raw sugar, refined sugar and other materials which may be employed as a source of carbohydrates.

A second class of bodies employed as raw materials is designated by the generic term "phenol". This term includes and has particular reference to phenols of the benzene series, such for example as carbolic acid and its homologues and derivatives the cresols and xylenols: polyhydric phenols of this series such for example as resorcinol: and the term further extends to include phenols of the naphthalene and other series, such for example as the naphthols.

It has been found that members of the saccharide and phenol genii may interact in such a way as to produce, in general, water insoluble bodies and also in many cases water soluble bodies as well. The water insoluble bodies are among those referred to in my former application as resinous.

It has been further found that the water insoluble bodies i. e. those not freely soluble in water (resinous) may by suitable treatment be transformed into resins or other products. The present invention is chiefly concerned with the production of such water insoluble bodies and their transformation into artificial resins, all as will be more fully hereinafter described and as claimed.

The term resinous denotes bodies which are not freely soluble in water, are the product or products of the reaction of a phenol and a carbohydrate and may be transformed into artificial resin. It also has the more common meaning i. e. of or pertaining to resins.

The resinous products of the present invention may be arbitrarily divided into two classes viz:

(a) water insoluble (not freely soluble) reaction products of a saccharide and a phenol.

(b) products of class (a) partly or more completely coagulated, condensed, resinified, polymerized, hardened or colloided.

Description may be divided into two parts corresponding to the two classes of products and processes of producing same.

Reaction between a carbohydrate and a phenol is obviously favored by intimate contact between the two and this may be effected in various ways.

For example the carbohydrate may be used to dissolve the phenol and vice versa. Or a mutual solvent may be employed that is one which dissolves or disperses both phenol and saccharide. Again the phenol may be dissolved in a solvent which may not dissolve the saccharide and churning or stirring used to effect intimate contact. Water may be added to such a mixture.

Water is perhaps the cheapest means which may be used to suspend, disperse or dissolve carbohydrates and phenols.

In addition to intimate contact between the carbohydrate and phenol it has been found that reaction between the two may be particularly favored by the application of a suitable "reaction promoting agent or agents".

The term reaction promoting agent as used in the specification and claims has particular reference to substances or agencies which are capable of hydrolyzing carbohydrates, for example mineral acids, e. g. hydrochloric acid; organic acids, e. g. oxalic, malic, tartaric and citric acids; acid salts and esters and other acid yielding or containing bodies. The term reaction promoting agent may also include water. As is well known water is capable of hydrolyzing (decomposing) carbohydrates particularly at elevated temperatures. This is particularly true where pressure is used to enable the temperature of water to be raised above 100 C. and thus increase the hydrolytic (decomposing) action of water.

The term reaction promoting agent may comprise heat energy or heat and mechanical energy, i. e. heat and pressure with or without the cooperation of a chemical reaction promoting agent, e. g. acid containing or—yielding bodies.

The term reaction promoting agent may also comprise bodies or agencies of the above mentioned nature in conjunction with neutral salts or esters e. g. sodium chloride.

The term reaction promoting agent may further comprise heat alone or heat in conjunction with a chemical substance. As shown in Example 3 below heat alone may be in some cases sufficient to cause reaction between a saccharide and a phenol with the production of water insoluble bodies of a resinous nature.

In general the reaction between a saccharide and a phenol may lead in the first instance to the production of resinous bodies of class (a), (see above), not freely soluble in water, tarry, dark colored in mass by reflected light, e. g. dark blue to black, yellow to brown in thin layers by transmitted light. Such bodies may be soluble in alcohol or acetone, in sodium hydroxide solution and be but slightly soluble or considerably less soluble in ammonium hydroxide solution. Such bodies may show a lack of compatibility with oils, e. g. cottonseed or linseed oils. Such bodies may possess aldehydic properties, e. g. have a capacity to reduce Fehling's solution and restore the violet color to magenta solutions previously decolorized by sulphur dioxide (Schiff's aldehyde test).

Such bodies may also possess the ability of decolorizing dilute solutions of potassium permanganate.

It may well be further characteristic of bodies of the class (a) type, especially such as possess a dark color, that they may be bleached by the action of reducing agents, as for example zinc dust and alcohol. For example, a black class (a) product made by the interaction of sucrose and carbolic acid, with oxalic acid as reaction promoting agent, was dissolved in alcohol and the alcoholic solution boiled with zinc dust. On evaporating the alcohol and heating the residue at about 120° C., a solid, yellow-brown transparent solid resin was obtained.

The following examples will illustrate certain methods of operation which may be employed to produce bodies of class (a) (and (b)) and afford illustrations of such terms as carbohydrate, phenol, intimate mixture, reaction promoting agent etc.

Ex. 1

| | |
|---|---|
| Carbohydrate | cane sugar (refined)_ 30 gr. |
| Phenol | carbolic acid_____ 10 gr. |
| Reaction promoting agent | hydriodic acid (sp. gr. 170)_____ 3 drops |

Intimate mixture of the phenol and carbohydrate was procured by heating these bodies in an open test tube to 190° C. at which temperature a clear solution of sugar in phenol was obtained. The addition of the hydriodic acid caused a vigorous reaction. The temperature dropped to 150° C. and was kept there for one hour. The cooled reaction mixture was washed with hot water and yielded a dark blue to black residue, balsamic or tarry in consistency.

Ex. 2

| | |
|---|---|
| Reaction promoting agent | Citric acid crystals__ 30 gr. |
| Carbohydrate | sucrose_____ 40 gr. |
| Phenol | carbolic acid_____ 60 gr. |

Intimate mixture of and reaction between these ingredients was secured by heating them together in an open test tube from 150° C. to 170° C. during one-half hour. The reaction products were then cooled and boiled with water. 70 grams of water insoluble brown resinous mass were obtained. This was hardened by exposure in thin layer in an air oven at 110° C. for about one-half hour and possessed elasticity.

Ex. 3

Phenol_____ beta naphthol_____ 10 gr.
Carbohydrate_____ sucrose_____ 30 gr.
Reaction promoting agent__ heat.

Intimate mixture of the beta naphthol and sucrose was obtained by fusing them together in a test tube to about 210° C. whereupon they became mutually soluble in one another. The temperatures used ranged from 150° C. to 210° C. during 40 minutes and stirring was employed. The reaction mixture was then cooled and treated with boiling water whereupon a brown, insoluble (in water) resinous residue was obtained, soft and balsam-like in consistency. This body was solidified, resinified and hardened by heating in a thin layer to 120° C. in an air oven.

Ex. 4

Carbohydrate_____ levulose_____ 20 gr.
Phenol_____ resorcinol_____ 10 gr.
Reaction promoting agent_ crystallized oxalic acid_ 1 gr.

Intimate mixture of the carbohydrate and phenol was procured by heating the two together at 120°-125° C. The oxalic acid was added and stirred with the reaction mixture for about one hour at the above temperatures and then at 170° C. for a few moments: then at 120° C. for two hours.

The reaction mixture was then cooled and extracted with hot water whereupon a black resinous very viscous tarry residue was obtained. This melted at 120° C. and became hard on cooling.

Details of methods of reacting phenols and saccharides are obviously capable of much variation as is indicated by the cases or examples already cited and described.

In some cases, as for example in the reaction between sucrose and carbolic acid, it may be conducive to increased yields of class (a) resinous bodies to keep the carbolic acid concentration low during reaction, i. e. not adding the entire amount at once but in portions, removing water insoluble class (a) bodies, adding fresh phenol, allowing reaction to proceed, again removing class (a) bodies, adding a further small proportion of phenol and repeating this cycle as long as class (a) bodies continue to form in appreciable or substantial amount.

It is to be remarked that in all of the examples given above the mixture of carbohydrate and phenol is heated above the boiling point of water and the water vapor allowed to escape instead of being condensed and refluxed as in the procedure described in my copending application above mentioned. In this manner water used as a solvent, or in the ingredients as moisture or as water of crystallization, as well as any water resulting from the condensation of the carbohydrate with the phenol is removed and the reacting substances subjected to temperatures much higher than is possible when water present in the batch is refluxed upon the reacting substances. By this method of procedure the desired reactions are more complete and resinous products are obtained having more desirable qualities and by the use of carbohydrates which, in fact, in some cases cannot be made to react at the temperature of the boiling points of water solutions. The final reaction is carried on in the absence, substantially, of water, whether there be water in the original ingredients or batch or not.

Discussion will now be concerned with class (b) products (see above) and methods of producing same. As set forth in my previous application Serial No. 517,721, class (a) products may be hardened or condensed by the application of suitable energy such as heat.

Heat may be in itself a physical condensing agent, using the word physical to distinguish it from such chemical substances as may be employed to cause, or assist in, the condensing or coagulating of bodies of the class (a) type and thereby transform the same into hard tough resins as will presently be more fully set forth.

It has been found that not only heat alone but also that many chemical substances may act on class (a) bodies and thereby coagulate the same into hard tough resins.

Such condensing or coagulating action may be stopped while the resin is yet fusible or it may be carried to the point where the resin is infusible. By the term infusible is meant the inability to melt to a liquid consistency. It does not necessarily mean that the body in question may not soften, more or less, on the application of sufficient heat.

During the period of condensing whether this be caused by heat, or heat plus chemical condensing agents, class (a) bodies may pass into, or through, a remarkable condition wherein they may exhibit resilient, rubber-like properties.

The condensed resins of the present invention (class b bodies) may in turn be divided into two groups, viz; partly condensed fusible resins and more completely condensed infusible resins.

It may well be that several variables may influence the degree of condensation, such for example as the temperatures employed during condensation, length of time that the condensing action is continued, nature of chemical condensing agent (if any), concentration or proportion of chemical condensing agent, presence or absence of superatmospheric pressure.

It may be noted that an increase in degree of condensation may be attended by a decrease in solubility and a decrease in fusibility (increase in melting point).

The term "condensing agent" as used in the specification and claims may comprise heat alone or it may include basic, base yielding or base containing bodies, such for example as ammonium hydroxide, ammonia gas, ammonium carbonate.

The term condensing agent may also comprise substances derived from, containing or yielding an acid. It may comprise etherial salts (esters) i. e. bodies made by combining an acid with an alcohol; inorganic salts; acid chlorides or anhydrides; organic or inorganic acids; halogen compounds. The following may be cited as examples: hydrochloric acid, aluminum chloride, sodium chloride, sulfurous acid, benzyl chloride, benzoyl chloride, trichloracetic acid.

The term condensing agent is a purely arbitrary one. The term condensation may or may not have a meaning coincidental with that which it has in the phraseology of organic chemistry.

There are various other terms which might better describe the action of the "condensing agent"; e. g. coagulating, consolidating, inspissating, thickening. Coagulating is perhaps as descriptive as any, since the action of condensing agents on class (a) bodies may well resemble to some extent, in many cases, the action of coagulating agents on colloids and colloidal solutions e. g. the action of heat on the "white of egg" or albumen solution, of formaldehyde on gelatine, of sulfur on rubber, of chloride of sulphur on unsaturated oils, and other and analogous phenomena wherein the changes are outwardly manifested by a thickening or increase in viscosity, an increase in solidity and often density, frequently of hardness and toughness and in general a decrease in chemical reactivity, which is often synonymous with increase in stability and commercial usefulness.

Polymerization is another term often loosely applied to such changes as are mentioned above.

The following examples may serve to illustrate certain methods of converting class (a) bodies into class (b) resins.

Ex. 5

*Ammonium hydroxide and ammonia as condensing agent*

Class (a) product_____ 20 gr.

This product somewhat resembled coal tar in color and consistency. On heating to 140° C. in a test tube its viscosity decreased. 5 ccm. of six normal ammonium hydroxide solution was gradually stirred into the melted resinous body. Heating and stirring at 140° C. was continued for 15 minutes. A remarkable condensation or coagulation took place. The material became so stiff and resilient that it could readily be pulled into sheets, when hot. It was then spread out and heated in an oven at 120° C. for one hour. On cooling the result was a hard tough resin, barely fusible and tended to become still less fusible as heating was continued. Color, black.

Ex. 6

*Benzyl chloride as condensing agent*

20 grams of class (a) product were stirred and gradually heated to 150° C. with 2 grams of benzyl chloride during one half hour. A marked thickening or coagulation took place; and on cooling there was observed the production of a resilient mass somewhat resembling crude rubber but not having so much tensile strength as the latter. The material was then pulled apart and placed on a tray in an oven 130° C. for about one half hour. It did not melt but merely softened somewhat. On cooling, the material became hard, with a smooth, glossy surface, difficult to scratch and resembled in consistency shellac which has been melted and cooled. Color was black. The solubility in ordinary alcohol was slight.

Ex. 6A

Ex. 6 was repeated using only 5 drops of benzyl chloride. The resulting resin was tough and fusible, indicating the influence of the concentration of condensing agent on the properties of class (b) resins. The solubility of this material in alcohol was greater than that produced as per Ex. 6.

Ex. 7

*Trichloracetic acid as condensing agent*

20 grams of class (a) product were heated as follows with one gram of trichloracetic acid.

```
4:15 P. M._____ 130 degrees centigrade (C.)
4:30 P. M._____ 130 degrees centigrade (C.)
4:50 P. M._____ 140 degrees centigrade (C.)
5:00 P. M._____ 140 degrees centigrade (C.)
5:10 P. M._____ 150 degrees centigrade (C.)
```

Considerable coagulation was observed. On cooling, a hard tough black fusible resin resulted.

Ex. 8

*Hydriodic acid as condensing agent*

20 grams of class (a) product were heated with 5 drops of hydriodic acid (sp. gr. 1.70) at 140°–150° C. for 40 minutes. A progressive thickening and the appearance of elastic properties were observed. The cooled condensed resin was washed with hot water and dried in an oven. On cooling a hard black resin was obtained which became less fusible the more it was heated, preferably above 100° C.

Ex. 9

*Condensation of class (a) products in the presence of extraneous bodies, for example natural resins*

20 grams of class (a) body, one-half cubic centimeter (ccm.) of benzyl chloride and 5 grams of rosin were heated together in a test tube at 110°-140° C. for one half hour. The appearance of resilient properties was noted and on cooling a hard black fusible resin was obtained. Rosin appears to retard the development of infusibility.

In some cases heat alone may not be sufficient to cause the desired degree of condensation of class (a) bodies, particularly where a high melting point or even infusibility is a desideratum of the final resin; and that in other cases, even when made from the same phenol and saccharide that heat alone may be sufficient to accomplish the desired degree of condensation. A theory that might account for a difference in behaviour is that certain reaction promoting agents may be held or adsorbed by class (a) bodies (during formation of the latter) more strongly than others and may not be entirely removed by washing; and may then act as chemical condensing agents.

Any possible or apparent discrepancy of this nature need cause no confusion for a simple test will determine whether a given class (a) body will condense by heat alone or whether an added chemical condensing agent is necessary. Reference to the appended examples will indicate methods for executing such tests.

Ex. 10

*Heat as condensing agent*

20 grams of class (a) product (made by the action of oxalic acid and sodium chloride on a solution of sucrose and ordinary phenol (or carbolic acid) in water) were heated gradually to 170° C. A progressive thickening was observed. The temperature was dropped to 150° C. and after remaining some time at this point the material became rubbery. On cooling a hard black tough resin was obtained.

Whereas the examples cited have in many cases dealt with the isolation of class (a) bodies before their conversion into the (b) stage, it may frequently be desired to produce class (b) resins directly. This may be accomplished, as for example by raising the temperature of the reaction between phenol and carbohydrate above 100° C. and continuing such action until (after purification as by washing with water) the resulting resins possess the properties desired. During the reaction the concentration or nature of the reaction promoting agent may be changed. If, for example, oxalic acid is the reaction promoting agent, reaction may be allowed to continue until it be deemed that the resulting resinous bodies require condensation, whereupon ammonia may be substituted for the acid and condensing action allowed to proceed, the latter at a temperature for example in excess of 100° C.

It will be noted that in many cases the reaction promoting agent and condensing agent may be identical and that the same agent may therefore initiate the reaction between a saccharide and a phenol and also carry that reaction to the point where condensed resins are obtained.

In another modification of the present invention, whether the action be carried on in one stage as described immediately above or in two stages, superatmospheric pressure may be applied to the reacting bodies during the whole or a part of the reaction.

For example, if the reaction be carried out in more than one stage with the production of class (a) bodies as the first stage, such bodies, if not already of sufficient hardness may be condensed to the point where they are of such a consistency as will permit reducing the same to a powder and such a powder may be packed into molds, with or without being first mixed with extraneous bodies, and heated in such molds until the desired degree of hardness and strength is attained.

The fusible resins may well be at least partially soluble in alcohol and the infusible ones contain little or slight alcohol soluble material. Both varieties may be dark colored, even black, may possess, in massive form, a hard surface, akin in non-scratching properties to the surface of high grade shellac. When heated such resins particularly the fusible ones may well emit a pleasant, characteristic odor. In the heated state such bodies may exhibit resilient characteristics.

In addition to the already mentioned condensing agents, oxidizing agents such for example as atmospheric oxygen may be used to assist in or cause condensing and hardening, for example by exposing the material in thin layers to the action of heated air.

What I claim is:

1. The process which comprises reacting by heat a carbohydrate with a phenol in the presence of a mineral acid while removing water from the reacting substances, whereby an initial resinous product is produced, adding thereto a substance free from free mineral acid and capable of reacting with said resinous product, and heating, whereby further reaction takes place.

2. The process which comprises heating a carbohydrate with a phenol in the presence of a mineral acid while removing water from the reacting substances, whereby an initial resinous product is produced, adding thereto a substance free from free mineral acid and capable of reacting with said resinous product, and heating, whereby further reaction takes place.

3. The process which comprises heating a carbohydrate with a phenol and a mineral acid while removing water from the reacting substances whereby an initial resinous condensation product is produced, and adding thereto a substance free from free mineral acid and capable of reacting with said resinous product, whereby a potentially reactive resinous composition is produced.

JOSEPH V. MEIGS.